United States Patent [19]
Franceschini

[11] 3,896,578
[45] July 29, 1975

[54] SELF-BALLASTING DECOY WATERFOWL

[76] Inventor: Augusto Franceschini, Via Argine Vecchio Volano, Rero (Province of Ferrara), Italy 44030

[22] Filed: Apr. 22, 1974

[21] Appl. No.: 462,633

[30] Foreign Application Priority Data
May 3, 1973 Italy.................................. 12602/73

[52] U.S. Cl. ...................................................... 43/3
[51] Int. Cl........................................... A01m 31/06
[58] Field of Search ................ 43/3, 2, 43.14, 42.22

[56] References Cited
UNITED STATES PATENTS
2,817,918  12/1957  Phillips...................................... 43/3
3,466,787  9/1969  Collins............................... 43/43.14

Primary Examiner—Warner H. Camp
Attorney, Agent, or Firm—Murray Schaffer

[57] ABSTRACT

A self-ballasting floating decoy waterfowl comprises a floating hollow body representing the waterfowl and a water ballast tank arranged below the water line of the floating hollow body, said tank being attached to the keel or underside of the floating hollow body by means of a suitable connecting rib. The ballast tank is in the form of an elongated hollow body provided in correspondence of its bottom with an opening for the inflow and outflow of the ballast water, and in correspondence of its top with a breather or air escape duct. Whenever the decoy waterfowl is put into the water, the water fills the ballast tank.

3 Claims, 3 Drawing Figures

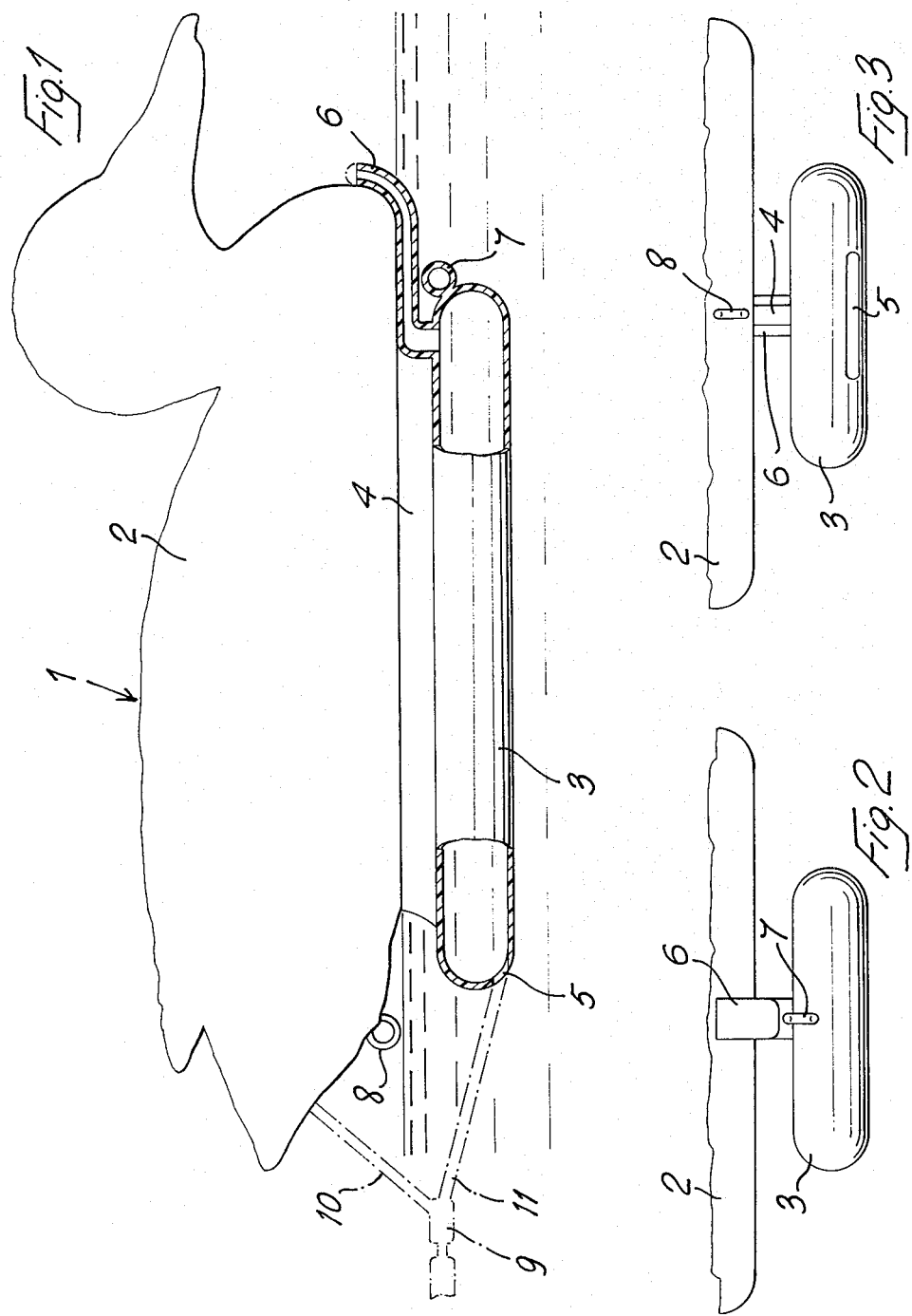

SELF-BALLASTING DECOY WATERFOWL

BACKGROUND AND SUMMARY OF THE INVENTION

The present invention relates to artificial decoys, and more particularly to a self-ballasting floating decoy waterfowl of the type used in waterfowl shooting, such as duck shooting in lakes, ponds and rivers.

Usually, the artificial decoys, which represent the waterfowl, consist of a floating body to the underside of which there is attached a suitable ballast so that when the same is floating on the water, the ballast ensures the proper draft and trim. The ballast is usually of the permanent type, i.e. it consists of some weights, preferably of metal, attached to the underside of the floating body, or incorporated into same.

The artificial decoys of the above mentioned type, in addition to the fact that they always carry their ballast, also when not in use, present the inconvenience that the ballasting of the decoy must be effected as a separate operation from the formation of the body of the decoy itself.

Object of the present invention is to provide an artificial decoy waterfowl which is self-ballasting, i.e. which becomes automatically ballasted when put into the water.

The self-ballasting decoy waterfowl according to the present invention substantially comprises a floating body which represents the waterfowl, which body is intended to float on the water, and which carries attached to its underside, or keel, a water ballast tank having the form of an elongated hollow body provided with an opening for permitting the passage of the water inside said tank so as to flood the same and provide the proper ballast. The ballast tank is also provided with an air escape duct for permitting a quick and easy outflow of the air whenever the ballast tank is being filled with water. The self-ballasting decoy waterfowl according to the invention is preferably made of moldable plastics material, and according to a preferred method of construction, it is obtained in a single blow-molding operation.

These and other features of the invention will be clearly understood from the following description of a preferred embodiment thereof with reference to the accompanying drawings, and the novel features will be particularly pointed out in the appended claims.

BRIEF DESCRIPTION OF THE DRAWINGS

FIG. 1 is a side view, with parts in section, of an artificial decoy waterfowl according to the invention.

FIGS. 2 and 3 represent, respectively viewed from the front and from the rear, the water ballast tank of the artificial decoy according to the invention.

DESCRIPTION OF THE PREFERRED EMBODIMENT

Referring to FIG. 1, the artificial decoy waterfowl comprises an upper hollow body 2, preferably obtained by blow-molding of plastics material, which is shaped and colored so as to constitute the proper decoy, appearing above the water surface, and which in the present case represents a duck or a similar waterfowl.

The hollow body 2 presents a flat underside keel portion which actually rests on the water, and to which there is secured a water ballast tank 3, by means of a longitudinal median connecting rib 4. The hollow body 2 is hermetically closed and does not present any communicating duct with the interior of the water ballast tank 3.

The ballast tank 3 (see also FIGS. 2 and 3) is constructed as an elongated hollow body, presenting a water inlet and discharge opening 5 at its rear end (i.e. at the end arranged in correspondence of the rear of the decoy duck) in correspondence of its bottom, and a breather or air escape duct 6 in correspondence of its forward top portion, said duct 6 being constructed in the form of a pipe which opens above the water line of the decoy duck.

The decoy duck is provided with suitable forward and rearward ring elements 7, resp. 8, which serve for anchoring the same when floating on the water.

The use of the described artificial decoy is simple and evident:

The decoy 1 is put into the water, so that the water flows, through the opening 5, inside the ballast tank 3, completely flooding the same. The air escapes through the breather duct 6, and, thanks to the relative positioning of the opening 5 and of the breather 6, the formation of air pockets inside the ballast tank 3 is avoided. When the ballast tank 3 is completely filled with water, the artificial decoy will float maintaining a proper draft and trim.

When the artificial decoy is taken out of the water, the ballast tank 3 will be emptied, since the water contained in it will flow out of the opening 5. The inflow of air is ensured through the breather 6.

It appears evident, therefore, that the artificial decoy, when not in use, is extremely light in its weight, since it is not provided, as in the prior art decoys, with a permanent ballast, made of metal, stone or the like weights, and which is incorporated into the decoy.

Another advantage of the artificial decoy according to the present invention resides in the fact that the same can be manufactured in a single blow-molding operation.

As indicated by dash-and-dot lines in FIG. 1, the compressed air for the blow-molding operation is injected through a duct 9 which bifurcates into ducts 10, for the artificial decoy 2 proper, and 11, for the water ballast tank 3. The two ducts 10, 11 are necessary since the hollow body 2 and the tank 3 must be separated, i.e. no connecting ducts are provided, as above mentioned, between them.

The breather or air escape duct 6 is blow-molded as a duct closed at its end, and after the molding of the article the tip of said duct 6 is cut off, as well as the ducts 10 (which is thereafter closed with a suitable plug) and 11 (which thus provides the opening 5 in the ballast tank 3).

It is believed that the invention will have been clearly understood from the foregoing detailed description of the preferred embodiment. Changes in the details of construction may be resorted to without departing from the spirit of the invention, and it is accordingly intended that no limitation be implied and that the hereto annexed claims be given the broadest interpretation to which the employed language fairly admits.

I claim:

1. A self-ballasting floating decoy waterfowl comprising:
   a. a floating body in the form of a closed hollow body representing a waterfowl, having an underside intended to directly rest on the water and a water line located above said underside whenever the decoy is used;

b. a connecting rib depending from the underside longitudinally along said floating body; and c. a ballast tank attached to said connecting rib and spaced at some distance from the underside of said floating body below the water line thereof, said tank being in the form of a longitudinally elongated hollow tubular body closed at each end and being provided in correspondence to the bottom of said tank at one of said ends with an opening for the passage of the water, and, in correspondence to the top at the opposite end with an upwardly directed air duct, terminating with its free end above the water line of the floating body for the escape of air from said tank.

2. The decoy according to claim 1 wherein said body, connecting rib and ballast tank are made of one piece plastic material.

3. A method for the manufacturing a self-ballasting floating decoy waterfowl according to claim 1, comprising blow molding the hollow body, ballast tank and connecting rib as a one piece unit in a single operation in a mold provided with separate cavities for the hollow body, the ballast tank and the breather duct connected thereto, injecting compressed air for the blow molding separately into each cavity, and thereafter cutting suitable portions of the resulting molded article, to form the opening in the ballast tank for the passage of the water and the opening in the free end of the breather duct.

* * * * *